US012799935B2

(12) United States Patent
Hill

(10) Patent No.: US 12,799,935 B2
(45) **Date of Patent: *Nov. 17, 2026**

(54) CALIBRATABLE VARIABLE DISPLACEMENT PUMP

(71) Applicant: FLUID METERING, INC., Syosset, NY (US)

(72) Inventor: Richard Charles Hill, Bay Shore, NY (US)

(73) Assignee: FLUID METERING, INC., Syosset, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/257,928

(22) Filed: Jul. 2, 2025

(65) Prior Publication Data

US 2025/0334112 A1 Oct. 30, 2025

Related U.S. Application Data

(63) Continuation of application No. 17/892,064, filed on Aug. 20, 2022, now Pat. No. 12,352,260.

(Continued)

(51) Int. Cl.

*F04B 49/12* (2006.01)
*F04B 7/06* (2006.01)

(Continued)

(52) U.S. Cl.

CPC ................ *F04B 51/00* (2013.01); *F04B 7/06* (2013.01); *F04B 9/02* (2013.01); *F04B 49/06* (2013.01);

(Continued)

(58) Field of Classification Search

CPC .... F04B 51/00; F04B 7/06; F04B 9/02; F04B 49/06; F04B 49/12; F04B 17/03;

(Continued)

(56) References Cited

U.S. PATENT DOCUMENTS

| | | | | |
|---|---|---|---|---|
| 4,736,674 A * | 4/1988 | Stoll | ....................... | F15B 15/24 92/13.8 |
| 5,020,980 A | 6/1991 | Pinkerton | | |

(Continued)

FOREIGN PATENT DOCUMENTS

| | | |
|---|---|---|
| CN | 104662294 A | 5/2015 |
| CN | 108361167 A | 8/2018 |

(Continued)

OTHER PUBLICATIONS

Extended European Search Report issued for European Patent Application No. 22859252.3 dated May 23, 2025, 12 pages.

(Continued)

*Primary Examiner* — Charles G Freay
(74) *Attorney, Agent, or Firm* — Duane Morris LLP

(57) ABSTRACT

A dispensing pump includes a linear actuator mounted on a base. The linear actuator includes a drive rod having a coupler. The coupler joins the drive rod to a first end of a connecting member. A second end of the connecting member is secured to a lower base portion of the base. An attachment plate attaches a motor to a first end of an upper base portion of the base. A flag is secured to the drive rod coupler, wherein the flag moves directly with the drive rod. The flag includes a body and a calibration element. The calibration element is positionally adjustable relative to the flag body. The calibration element is adapted to activate a proximity sensor when the linear drive is in a home position. The home position is adjustable upon adjustment of the calibration member.

20 Claims, 11 Drawing Sheets

Related U.S. Application Data

(60) Provisional application No. 63/235,404, filed on Aug. 20, 2021.

(51) Int. Cl.

| | |
|---|---|
| ***F04B 9/02*** | (2006.01) |
| ***F04B 49/06*** | (2006.01) |
| ***F04B 51/00*** | (2006.01) |
| ***G01B 21/16*** | (2006.01) |
| *F04B 17/03* | (2006.01) |

(52) U.S. Cl.
CPC .............. *F04B 49/12* (2013.01); *G01B 21/16* (2013.01); *F04B 17/03* (2013.01); *F04B 2201/1205* (2013.01); *F04B 2201/12051* (2013.01); *F04B 2207/046* (2013.01); *G01D 2205/10* (2021.05); *G01D 2205/40* (2021.05)

(58) Field of Classification Search
CPC .... F04B 2201/1205; F04B 2201/12051; F04B 2207/046; G01B 21/26; G01D 2205/10; G01D 2205/40
USPC .................... 73/1.36, 1.75, 1.79, 393, 398 R
See application file for complete search history.

(56) References Cited

U.S. PATENT DOCUMENTS

| | | | | |
|---|---|---|---|---|
| 5,141,402 | A * | 8/1992 | Bloomquist | H02K 17/30 417/217 |
| 5,246,354 | A | 9/1993 | Pardinas | |
| 6,283,721 | B1 | 9/2001 | Wilhelm | |
| 6,694,797 | B2 | 2/2004 | Luik | |
| 6,913,933 | B2 | 7/2005 | Jacobs et al. | |
| 7,275,474 | B2 * | 10/2007 | Larkin | G01D 5/34776 91/1 |
| 8,348,628 | B2 | 1/2013 | Hala | |
| 8,950,314 | B2 * | 2/2015 | Moberg | F04B 1/324 92/5 R |
| 12,352,260 | B2 * | 7/2025 | Hill | F04B 17/03 |
| 2005/0013708 | A1 | 1/2005 | Peeler et al. | |
| 2008/0043251 | A1 * | 2/2008 | Davidson | G01B 21/16 356/615 |
| 2009/0041599 | A1 | 2/2009 | Sweeney et al. | |
| 2012/0215200 | A1 | 8/2012 | Matsuura et al. | |
| 2016/0245275 | A1 | 8/2016 | Rawlings | |
| 2022/0213884 | A1 | 7/2022 | Suh et al. | |

FOREIGN PATENT DOCUMENTS

| | | | |
|---|---|---|---|
| CN | 109555661 | A | 4/2019 |
| JP | 2001115951 | A | 4/2001 |
| JP | 2020153284 | A | 9/2020 |
| WO | 2021022034 | A1 | 2/2021 |

OTHER PUBLICATIONS

PCT International Search Report corresponding to Application No. PCT/US22/40976 dated Oct. 18, 2022.

* cited by examiner

CALIBRATABLE VARIABLE DISPLACEMENT PUMP

CROSS-REFERENCE TO RELATED APPLICATIONS

This application is a continuation of U.S. patent application Ser. No. 17/892,064, filed Aug. 20, 2022, which claims the benefit of priority to U.S. Provisional Patent Application Ser. No. 63/235,404 filed on Aug. 20, 2021, the contents of which are incorporated by reference herein in their entireties for all purposes.

FIELD OF INVENTION

The present invention relates to variable displacement pumps used to accurately dispense small amounts of fluids. In particular, the invention relates to a mechanism that allows calibration of electronically adjustable dispensing pumps to control the dispense volume.

BACKGROUND

Variable displacement pumps known in the art include valve-less pumps, which have a base, interposed between a drive motor and a pump head. These bases may be injection molded plastic and incorporate a living hinge separating an upper base portion from a lower base portion. The upper base portion can be tilted with respect to the lower base portion by flexure of the living hinge. The relative angle between the upper and lower base portions establishes the pump output volume per revolution. This mechanism is described in commonly owned U.S. Pat. Nos. 5,020,980 and 4,941,809, and 10,995,747, each of which is incorporated herein in its entirety.

Conventionally, the method for adjusting and setting the angle is accomplished by means of an adjusting screw engaging with pivot pins in the two portions of the base, which are positioned on the opposite side of the central axis of the base. Certain applications require pumps with the same target output per revolution. This was accomplished by substituting fixed linkage means for the adjustable screw and pivot pins. The fixed links are injection molded from plastic resin and the tooling used to mold these links allows for different lengths to be produced such that different target pump displacements can be routinely produced. An eccentric bushing providing a combination of the benefits of an adjusting screw and a fixed link is disclosed in commonly owned U.S. Patent Application Publication No. 2016/0245275.

These traditional methods for changing the output volume per revolution by adjusting the angle between the upper base portion and lower base portion have all required manual adjustment. This has generally made conventional pumps only convenient for use at a single output volume per revolution.

There are applications where it would be beneficial to be able to electronically adjust the output volume per revolution. This would allow an electronic system to adjust these pumps without manual intervention. U.S. Pat. No. 7,708,535 discloses a method for electronic adjustment of the angle of the base. However, the device disclosed in this patent uses rigid members to translate linear motion to angular motion. This leads to varying angular movement relative to linear movement, which leads to a complex relationship when defining the linear motion required to adjust the angle between the two portions of the base.

Pumps have been developed with can electronically and remotely adjust the angle to vary the dispense volume. Such a pump is set forth in PCT Application Serial No. PCT/US20/44452, the entire content of which are incorporated by reference herein for all purposes. An adjustment device adjusts the angle between a motor shaft and piston pump. The adjustment device includes a linear actuator having a shaft operably connected to a pump head to change the angle. Such design however, present a challenge to calibrate the pump to permit precise dispense volumes. The home position of the linear actuator is not reliably determined due to dimensional variations in the components and the inherent tolerances in a pump assembly. Therefore, the set angle may not match a desired angle resulting in inaccurate flow volumes.

Accordingly, it would be desirable to provide a means for the calibration of output volume per revolution of an electronically adjustable dispensing pump.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure provides a dispensing pump having a calibration system including a base including an upper base portion having a first end for mounting a motor and a second end and a lower base portion for mounting a pump on a first end and a second end. A hinge pivotally connects the second end of the upper base portion and the second end of the lower base portion. A linear actuator is mounted on the base and includes a drive rod having a coupler secured to an end thereof. The coupler joins the drive rod to a first end of a connecting member. A second end of the connecting member is secured to the lower base portion. An attachment plate attaches the motor to the first end of the upper base portion. The attachment plate extends outwardly from the motor for mounting the linear actuator. A proximity sensor is secured to the base upper position. A flag is secured to the drive rod coupler, wherein the flag moves directly with the drive rod. The flag includes a body and a calibration element projecting therefrom. The calibration element is positionally adjustable relative to the flag body. The calibration element is adapted to activate the proximity sensor when the linear drive is in a home position. The home position is adjustable upon adjustment of the calibration member. An actuation of the linear actuator drives the connecting member causing the lower base portion and upper base portion to pivot with respect to each other about the hinge, thereby changing an angle between the lower base portion and the upper base portion.

The present disclosure also provides a motor and pump assembly including a base including an upper base portion having a first end and a second end. A lower base portion has a first end and a second end, and a hinge pivotally connects the upper base portion and the lower base portion. A motor having an attachment plate is mounted to the first end of the upper base portion. The motor having a shaft that is rotatable about a rotation axis. A proximity sensor is secured to the upper base portion. A pump is mounted to the first end of the lower base portion. The pump has a piston rotatable about a rotation axis and is linearly translatable along the rotation axis. The pump piston is coupled to the motor shaft. A linear actuator is mounted to the attachment plate and has a drive member. A flag is secured to the output of the drive member.

The flag includes a body and a calibration element projecting therefrom. The calibration element is positionally adjustable relative to the flag body and is adapted to activate the proximity sensor when the linear drive is in a home position. The home position is adjustable upon adjustment of the calibration member. Actuation of the linear actuator pivots the upper base portion with respect to the lower base portion about the hinge thereby changing an angle between the rotation axis of the motor shaft and the rotation axis of the pump piston.

The present disclosure also provides a method of calibrating a dispensing pump having an electronic adjustment including:

- providing a signal to a motor to operate an actuator for adjusting the flow rate of a dispense pump, the motor mounted to a base including a proximity sensor, the actuator having a home position, the pump having a flow rate responsive to the home position;
- operating the motor until the sensor detects the presence of a flag, the flag including a calibration element which is positionally adjustable relative to a flag body, and wherein adjustment of the position of the calibration element adjusts the home position of the actuator; and
- adjusting the calibration element to change the home position thereby calibrating the flow rate of the pump to a desired value.

The present disclosure further provides a dispensing pump having a calibration system including a base including an upper base portion having a first end for mounting a motor and the upper base portion having a second end, and including a lower base portion for mounting a pump on a first end and the lower base portion having a second end. A hinge pivotally connects the second end of the upper base portion and the second end of the lower base portion. A linear actuator is mounted on the base. The linear actuator includes a drive rod operably coupled to the lower base portion. An attachment plate attaches the motor to the first end of the upper base portion, and the attachment plate extends outwardly from the motor for mounting the linear actuator. A proximity sensor is secured to the base upper position. A flag is operably coupled to the drive rod coupler, wherein movement of the drive rod coupler causes movement of the flag. The flag includes a body and a calibration element projecting therefrom. The calibration element is positionally adjustable relative to the flag body. The calibration element is adapted to activate the proximity sensor when the linear drive is in a home position. The home position is adjustable upon adjustment of the calibration member. Actuation of the linear actuator drives the connecting member causing the lower base portion and upper base portion to pivot with respect to each other about the hinge, thereby changing an angle between the lower base portion and the upper base portion.

The present disclosure still further provides a dispensing pump having a calibration system including a base including an upper base portion having a first end for mounting a motor and the upper base portion having a second end, and including a lower base portion for mounting a pump on a first end and the lower base portion having a second end. A hinge pivotally connects the second end of the upper base portion and the second end of the lower base portion. A linear actuator is mounted on the base. The linear actuator includes a drive rod operably coupled to the lower base portion. An attachment plate attaches the motor to the first end of the upper base portion, and the attachment plate extends outwardly from the motor for mounting the linear actuator. A proximity sensor is secured to the base upper position. A flag is coupled to the lower base portion. The flag includes a body and a calibration element projecting therefrom. The calibration element is positionally adjustable relative to the flag body. The calibration element is adapted to activate the proximity sensor when the linear drive is in a home position, the home position being adjustable upon adjustment of the calibration member. Actuation of the linear actuator drives the connecting member causing the lower base portion and upper base portion to pivot with respect to each other about the hinge, thereby changing an angle between the lower base portion and the upper base portion.

DETAILED DESCRIPTION

Figure 1:
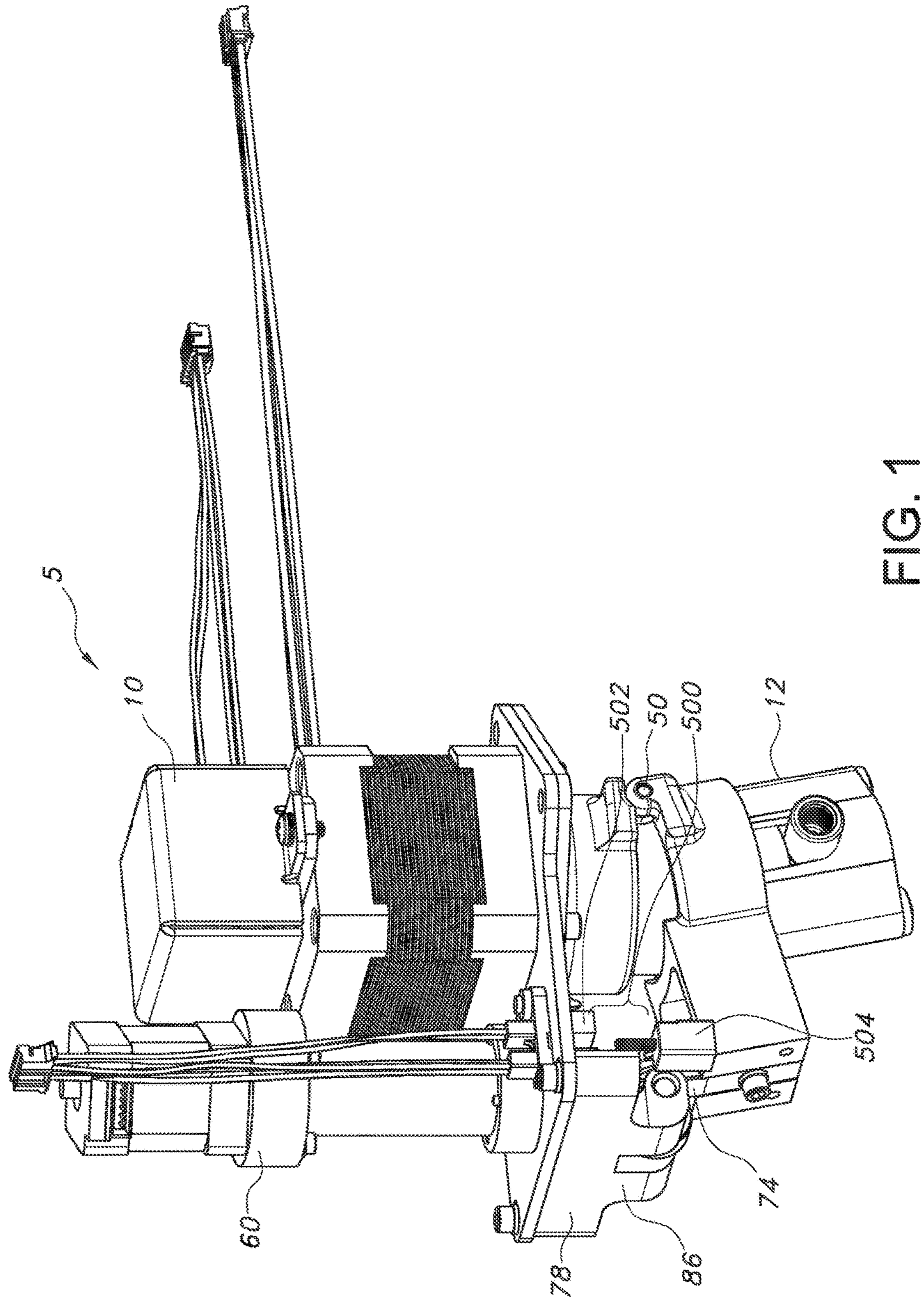
FIG. 1 is a perspective view of a calibratable variable displacement pump.

FIG. 1 shows an adjustable variable displacement pump and motor assembly 5 of the present disclosure. The assembly 5 includes a motor 10 connected to a pump head 12 via a base 14. The motor and pump may be of a type described in PCT Application Serial No. PCT/US20/44452 the contents of which are incorporated by reference herein. The motor 10 has a shaft that rotates about a rotational axis. The pump has a piston that also rotates about a rotational axis and translates in the direction of the rotational axis. The shaft of the motor is coupled to the piston of the pump so that rotation of the motor shaft will cause rotation of the pump piston. By tilting the rotational axis of the pump piston with respect to the rotational axis of the motor shaft, rotation of the motor shaft will also cause linear translation of the pump piston in a manner that is described in further detail below. A pump and motor support arrangement of this type is shown and described in commonly owned U.S. Pat. Nos. 4,941,809 and 5,020,980, the specifications of which are incorporated herein by reference in their entirety for all purposes.

Figure 2:
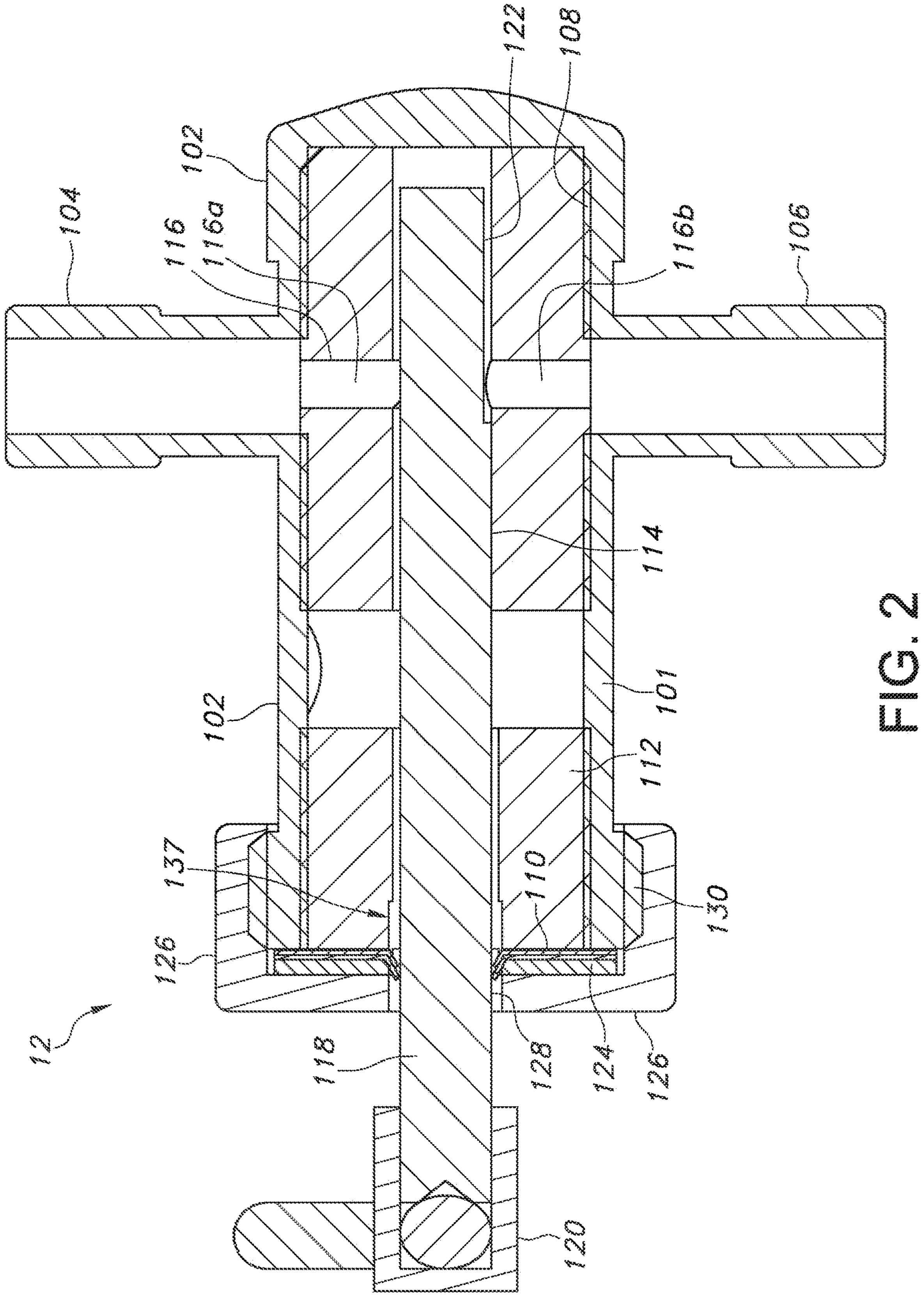
FIG. 2 is a cross-sectional view of a pump head.

Referring now to FIGS. 1-2, the pump and motor arrangement operates as follows. The pump 12 generally includes a pump housing 101 and a piston 118. The pump housing 101 includes a plastic pump casing 102 having an inlet port 104 and an outlet port 106. The pump casing 102 defines a cylindrical chamber 108 having an open end 110. Received in the cylindrical chamber 108 is a ceramic piston liner 112 having a central longitudinal bore 114 and a transverse bore 116 communicating with the longitudinal bore 114. The transverse bore 116 includes a liner inlet port 116*a* fluidly communicating with the inlet port 104 of the pump casing 102 and a liner outlet port 116*b* fluidly communicating with the outlet port 106 of the pump casing so that a liquid can be pumped from the inlet port 116*a*, through the liner, to the outlet port 116*b* in a manner described below.

The pump piston 118 is axially and rotatably slidable within the central bore 114 of the piston liner 112. One end of the piston 118 extends out of the open end 110 of the pump casing 102 and includes a coupling 120 for engagement with the shaft of the motor 10. At its opposite end, the piston 118 is formed with a relieved or "cutout" portion 122 disposed adjacent the transverse bore 116 of the pump liner. As described below, the relieved portion 122 is designed to direct fluid into and out of the pump 12.

A seal assembly 124 is provided at the open end 110 of the pump casing 102 to seal the piston 118 and the pump chamber 108. The seal assembly 124 is retained at the open end 110 of the pump casing 102 by a gland nut 126 having a central opening 128 to receive the piston 118. The gland nut 126 is attached to the pump casing 102 with a threaded connection 130.

In operation, the motor 10 drives the piston 118 to axially translate and rotate within the central bore 114 of the piston liner 112. In order to draw liquid into the transverse bore 116 from the inlet port 104, the piston 118 is rotated as required to align the relieved portion 122 with the liner inlet port 116*a*. The piston 118 is then drawn back as required to take in the desired volume of liquid into the central bore 114 of the pump liner 112. Withdrawal of the piston 118 produces a negative pressure within the liner inlet port 116*a* of the transverse bore 116, which draws in liquid from the casing inlet port 104. The piston 118 is then rotated to align the relieved portion 122 with the liner outlet port 116*b*. Finally, the piston 118 is driven forward the required distance to force liquid into the outlet port 116*b* of the transverse bore 116 to produce the desired discharge flow.

Thus, each rotation of the motor shaft rotates the piston of the pump. Due to the angular orientation between the pump heat 12 and the motor 10, each rotation of the motor shaft further causes the pump piston to reciprocate in the axial direction to alternately draw in and push out fluid to transfer fluid between an inlet and an outlet of the pump. The amplitude of the piston stroke determines the volume of the fluid delivered between the inlet and the outlet of the pump. By varying the angle of the pump head 12 with respect to the motor 10, the stroke of the piston 118 is adjusted thereby adjusting the volume of the fluid transferred between the inlet and the outlet.

In such pump and motor arrangement, the angle of the pump 12 with respect to the motor 10 is adjustable via the base 14 to provide a desired volumetric flow of the pump with each rotation of the motor shaft. Therefore, it is desirable to provide a base 14 that is adapted for adjusting the angle between the axis of the pump and the motor shaft.

Referring now to FIGS. 2-5, an adjustable pump and motor assembly 5 with an angle adjustment actuator 60 is shown. The adjustable pump and motor assembly 5 includes a motor 10, such as a stepper motor, connected to a fixed displacement pump 12 (as described above with reference to FIG. 2) via a base 26 with a pivotally connected upper base portion 46 and a lower base portion 48. The motor 10 has a shaft (not shown) that is connected to a spindle coupling 120 and the shaft rotates the spindle coupling 120 about a rotational axis. The pump piston 118 also rotates about a rotational axis and translates in the direction of its rotational axis. One end of the piston 118 is connected to the spindle coupling 120.

By tilting the rotational axis of the pump piston 12 with respect to the rotational axis of the motor shaft 28, rotation of the motor shaft will also cause linear translation of the pump piston 30 and increase or decrease the volume of the chamber 35 at the distal end of the piston 30.

The angle between the axis of the pump piston 118 and the motor shaft is determined by means of the base 26 having an upper base portion 46 and a lower base portion 48 pivotally connected to one another via a hinge 50. The upper base portion 46 has a flange 52 that attaches to the motor 10, and the lower base portion 48 has a flange 54 that holds the pump head 24 that houses the piston 30 and cylinder 38. The hinge 50 allows the upper base portion 46 to be tilted relative to the lower base portion 48 in a direction indicated by arrow 47 in FIG. 3. These portions 46 and 48 are formed separately and rotatably connected with a pinned hinge 50. Alternatively, it is contemplated that base 26, including the upper base portion 46 and lower base portion 48, may be injection molded together with a living hinge.

Adjustment of the angle between the motor shaft and the pump piston 118 is achieved with an electronic adjustment mechanism 59 as shown in FIGS. 1, 3-5. The electronic adjustment mechanism 59 includes a linear actuator 60 attached to one of the flanges of the base 26. The linear actuator 60 is attached to the motor flange 52 of the upper base portion 46. However, it is conceivable for the actuator 60 to be attached to the opposite pump flange 54, wherein the arrangement of the remaining associated components described herein would be reversed.

The linear actuator 60 is preferably an electronic device capable of translating a linear actuator drive rod 62 in precise increments along a linear axis 64 extending parallel to the rotational axis of the motor shaft. One type of linear actuator for use in the present invention is known in the art as a captive nut linear actuator that includes a stepper motor for precisely controlling the position of the drive rod 62.

The motor flange 52 on the upper base portion 46 is preferably attached to the motor 10 by an attachment plate 66. The attachment plate 66 extends outwardly from the motor 10 and is sized and shaped to allow mounting of the linear actuator 60 of the electronic angle adjustment mechanism 59 to an upper surface 68 of the attachment plate 66. The mounting of the linear actuator 60 and the motor 10 on the upper surface 68 of the attachment plate 66 and mounting of the motor flange 52 on a lower surface 70 of the attachment plate 66 can be accomplished with conventional fasteners, such as bolts with threaded connections in respective components. Preferably, the attachment plate 66 extends outwardly from the motor 10 and is formed from a single sheet of metal and shaped to accommodate the electronic angle adjustment mechanism 59.

Figure 5:
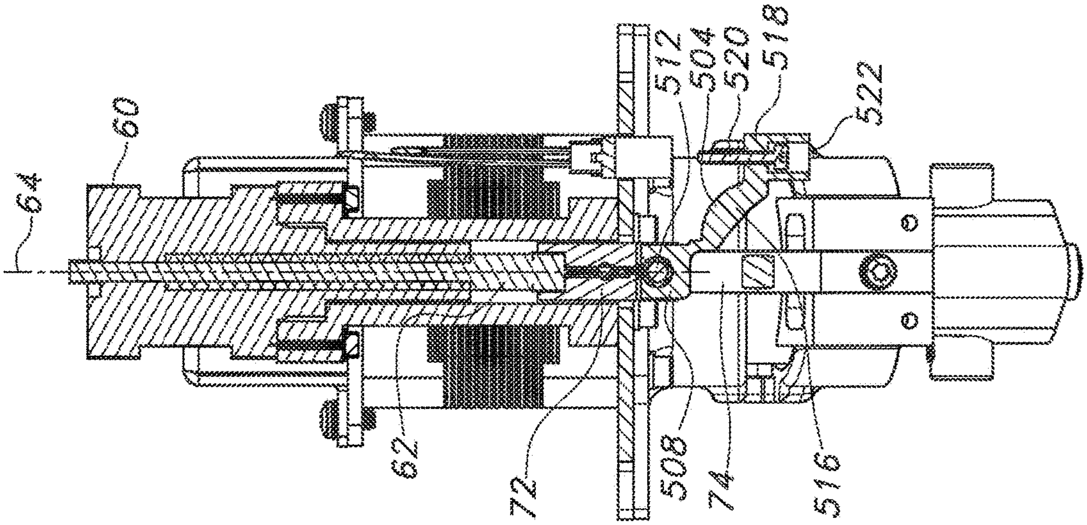
FIG. 5 is a cross-sectional view of the pump taken along the line 5-5 in FIG. 3.

With specific reference to FIG. 5, attached to a distal end of the linear actuator drive rod 62 of the linear actuator 60 is a drive rod coupler 72. The drive rod coupler 72 extends outwardly from the linear actuator 60 in the axial direction along the longitudinal axis 64. The drive rod coupler 72 further extends axially through an opening provided in the attachment plate 66 between the upper and lower surfaces. Attached to a distal end of the drive rod coupler 72, opposite the drive rod 62 is a connecting member 74.

The connecting member 74 may be formed of a flexible material. The flexible connecting member 74 is preferably made from a material having the strength to transfer the linear force imparted by the drive rod 62 along its longitudinal axis 64, yet flexible enough to allow for some slight bending, as will be discussed further below. A suitable material for the flexible member, for example, is spring steel.

The flexible connecting member 74 has a first end attached to the distal end of the drive rod coupler and a second end, opposite the first end, connected to the lower flange 54 of the base 26. Thus, linear motion of the linear actuator drive rod 62 will cause linear motion of the flexible member 74 in the same direction. Because the linear actuator 60 is connected to the upper base portion 46 and the flexible member 74 is connected to the lower base portion 48, linear motion of the flexible member 74 will cause the lower base portion 48 to pivot with respect to the upper base portion 26 about the hinge 50.

The flexible member 74 initially extends from the drive rod coupler 72 in a direction along the linear axis 64 of the linear actuator drive rod 62. However, the flexible member 74 is permitted to begin to bend at a point along the longitudinal axis 64 beyond the drive rod coupler 72. Such bending of the flexible member 74 is desirable to compensate for the arc shaped path of travel of the end of the lower flange 54 opposite the base hinge 50.

The bending of the flexible member 74 can be facilitated by a cam block assembly 76 and a roller bearing assembly 78. The cam block assembly 76 includes a bracket 80 mounted to the lower flange 54 of the base 26 opposite the base hinge 50. Any attachment means can be used. For example, a conventional screw fastener engaged in a threaded hole formed in the lower flange 54 will be sufficient.

Figure 6:
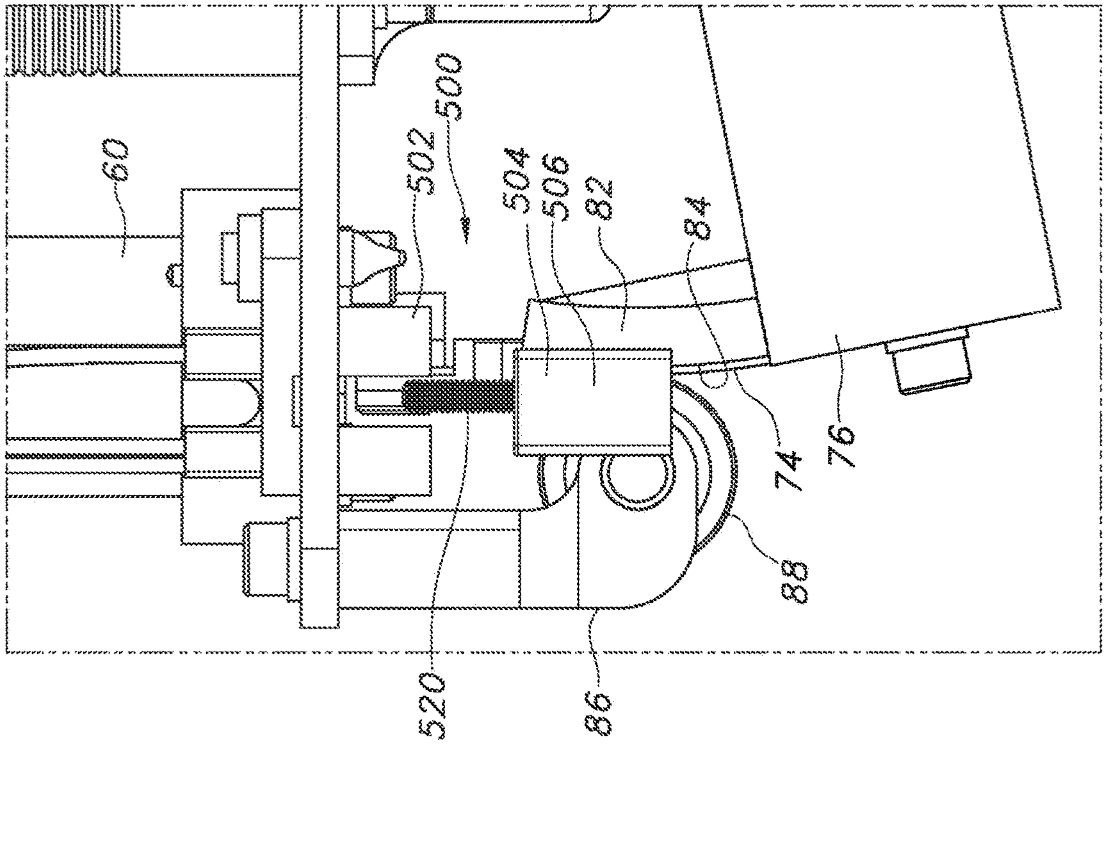
FIG. 6 is a detail view of the pump calibration system.

Further reference to FIG. 6, the cam block assembly 76 further includes a cam block 82 supported by the bracket 80. The cam block 82 has a curved support surface 84 facing the flexible member 74. The curved support surface 84 of the cam block 82 has a radius of curvature about the pivot point of the base hinge 50 defined by the distance from the pivot point to the intersection point of the flexible member 74 with the lower flange 54 of the base 26. With the flexible member 74 bearing against the curved support surface 84 of the cam block 82, the flexible member 74 will traverse a curved path coinciding with the path of the distal end of the lower flange 54 about the base hinge 50.

The roller bearing assembly 78 includes a bracket 86 mounted to the attachment plate 66. The bracket 86 rotatably supports a roller bearing 88 positioned opposite the cam surface 84 of the cam block 82. In this regard, the roller bearing 88 can be rotatably mounted on a pin fixed to the roller bearing assembly bracket 86. The roller bearing 88 here is used to help constrain the flexible member 74 against the curved support surface 84. One or more springs (not shown) could also be included with the roller bearing assembly 78 to provide an ongoing bias on the roller bearing 88 for pressing the flexible member 74 against the cam block 82. Without the roller bearing 88, the flexible member 74 would only be constrained by the drive rod 62 and would therefore, be susceptible to bending outwardly.

Figure 3:
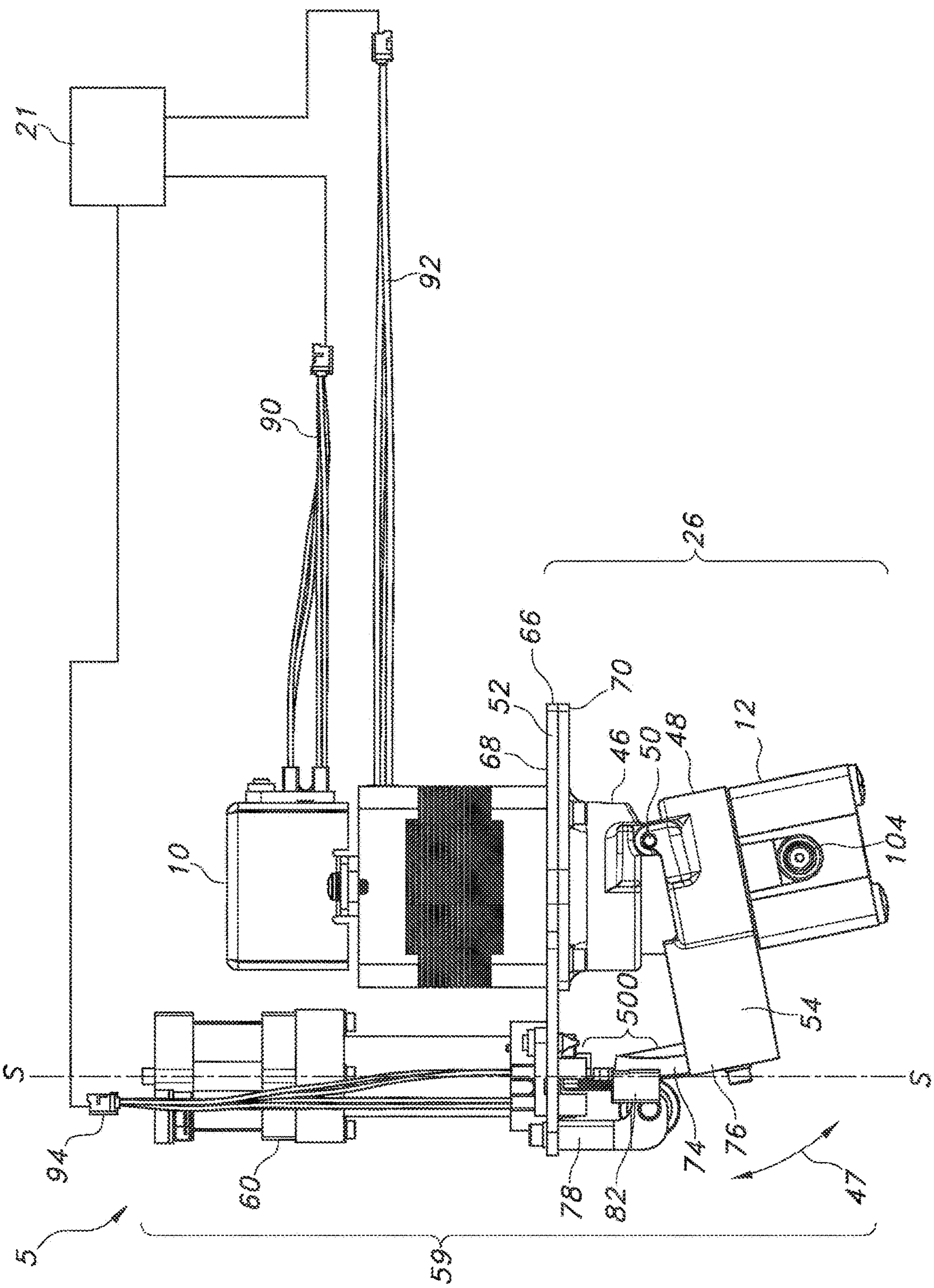
FIG. 3 is a side elevational view of the pump of FIG. 1.
Figure 4:
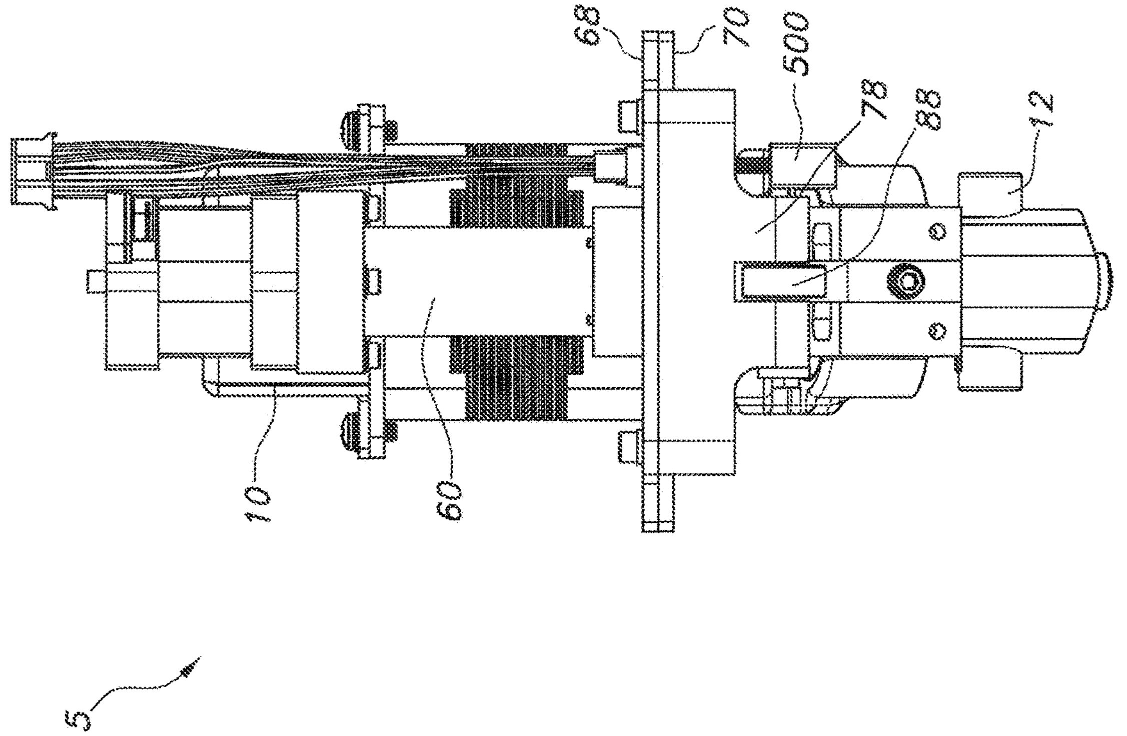
FIG. 4 is a front view of the pump of FIG. 1.

With reference to FIG. 3, as can be appreciated from the description above, at least some embodiments of the present invention include a controller 21 that is coupled to the motor 10 and the linear actuator 60 via respective electrical lines 90, 92, and 94. One such example of a controller is a computer device that enables dynamic control of the linear actuator 60 and causes the electronic adjustment mechanism 59 to be precisely and repeatedly modified. As such, the volume of fluid dispensed is extremely accurate, repeatable, and dynamic. One skilled in the art will appreciate that the invention may be practiced by one or more computing devices and in a variety of system configurations, including in a networked configuration.

As noted above, the movement of the drive rod 62 by changing the angle between the axis of the pump and the motor adjusts the travel distance of the piston 118 and determines the maximum volume of the chamber 35 and the flow rate. Thus, the angle between the motor and pump directly corresponds to the position of the drive rod 62. When a system including the motor, pump, and electronic adjustment mechanism 59 are assembled, due to tolerances and inherent variations in the system, the actual set angle created by the linear drive may not match the desired angle. Therefore, the flow volume will not be precise. Accordingly, calibration of the pump assembly and linear actuator 60 is desired. In order to calibrate the pump assembly 5, it is desirable to determine the starting, or home position, of the linear actuator. Position adjustments of the drive rod 62 can then be made with reference to a known position. When that location is known, adjustments to the flow rate can be made reliably and repeatedly. In order to permit calibration of the linear actuator, the present disclosure provides a calibration system 500.

Figure 7:
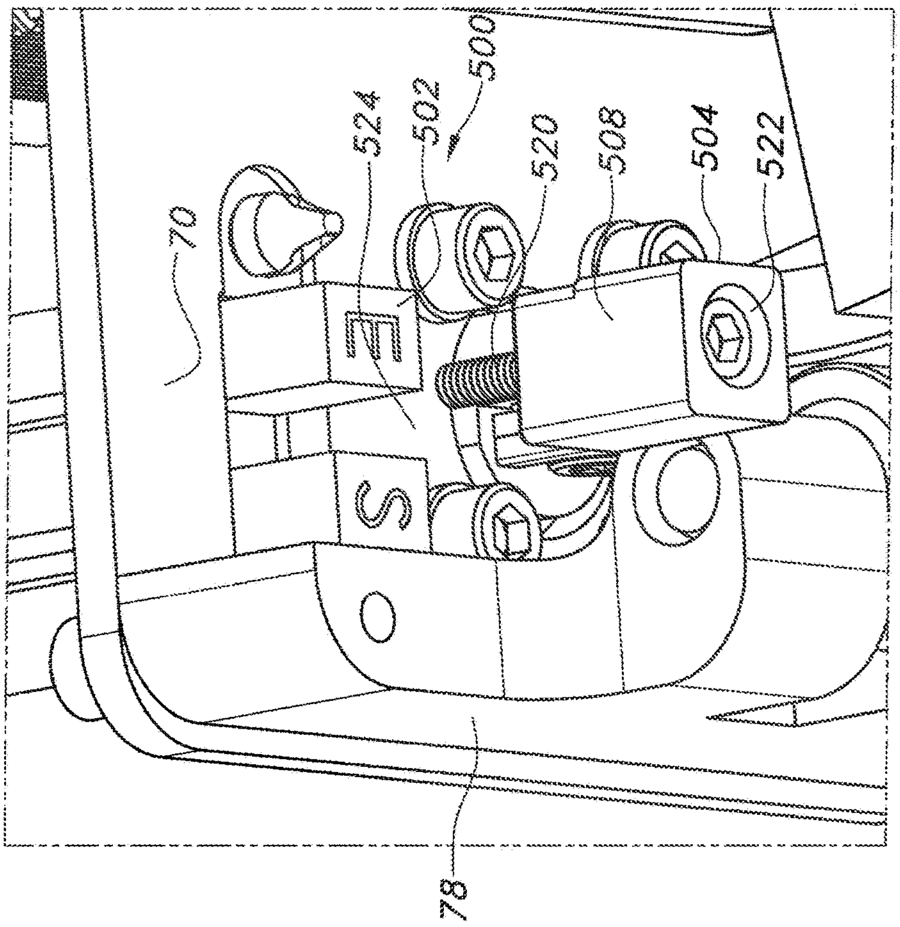
FIG. 7 is a detail bottom perspective view of the pump calibration system
Figure 8:
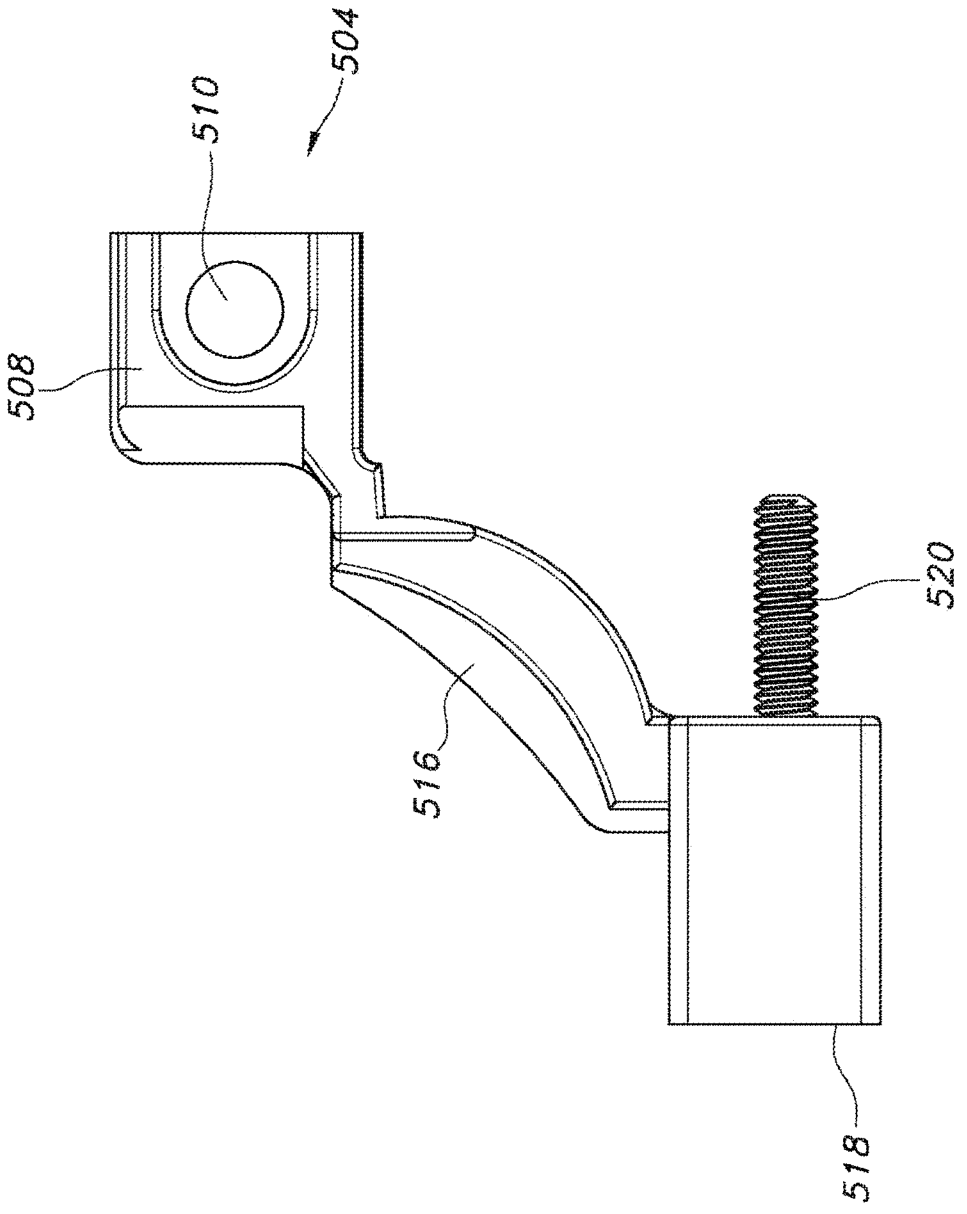
FIG. 8 is a top plan view of a calibration system flag element.

With reference to FIGS. 6-8, the calibration system 500 includes a sensor 502, and an adjustable flag 504. The adjustable flag 504 cooperates with the sensor 502 to provide a signal when the linear actuator drive rod 62 is in a predetermined position. The sensor 502 may be a proximity-type sensor, which generates a signal when an object approaches. The flag 504 may include a rigid flag body secured to the drive rod coupler 72. Since the drive rod coupler 72 is secured directly to the linear actuator drive rod 62, securing the flag 504 on the coupler will permit the flag to reliably indicate the precise position of the drive rod 62.

The flag 504 has an attachment section 508 at one end for securing the flag to the coupler. The attachment section 508 includes a through hole 510 to permit a fastener (not shown) to extend therethrough and engage a threaded opening (not shown) in the coupler 72. An elongate flag arm 516 extends from the attachment section 508 terminating in a flag head 518. The head 518 may have a block shape, although other shapes are contemplated. A calibration element 520 is movably connected to the head 518 and it cooperates with the sensor 502 to generate a signal. The position of the calibration element 520 can be adjusted relative to the head 518, which permits the effective length of the flag 504 to be adjusted. The calibration element 520 may be a threaded rod or screw threadedly engage with a through opening 522 in the head. The opening 522 provides access to the calibration element 520. The position of the calibration element 520 will remain fixed relative to the head unless adjusted by a user. By turning the calibration element 520, the amount the element 520 extends from the head 518 is changed. Therefore, the drive rod position that is to be deemed the home position is adjustable. While a threaded rod and threaded opening in the head is shown and described, it is contemplated that adjusting the position of the calibration element relative to the head may be achieved in a different manner. For example, the calibration element may include a sliding element wherein a rod slides relative to a head, or it may be a gear arraignment that adjusts the position of a shaft. In addition, an eccentric bushing that is positionally adjustable may be used to change the position of the calibration element.

As the linear actuator 60 is operated, the flag 504 will move along with the drive rod 62 by virtue of its being attached to the drive rod coupler 72. When the linear actuator 60 moves the coupler, and flag 504 secured thereto, toward a retracted position, the calibration element 520 will eventually be brought within the sensing path 524 of the sensor 502. This generates a signal that is transmitted to the controller 21. The signal indicates that the linear actuator 60 has reached a predetermined home position. The calibration element 520 permits this home position to be adjusted to a desired actual position of the drive rod so that a precise flow rate can be achieved. For example, by extending the calibration element outwardly 520, the sensor 502 will be activated sooner in the drive rod retract stroke. Conversely, retracting the adjustment element 502, such that it protrudes less from the head 508, will cause the sensor 502 to be activated later in the drive rod retract stroke. In this way, the flow rate sensed home position can be adjusted and the motor/pump angle controlled to provide a desired output flow volume.

In operation, the pump flow rate can be calibrated by way of the calibration system 500. The amount of fluid dispensed by the pump assembly 5 depends on the angle between the pump head 12 and motor 10. In order to control the angle, a signal is provided from the controller 21 to the linear actuator 60. In response to the signal, the linear actuator 60 will advance the drive rod 62 a predetermined amount from a home position, which is sensed by the sensor 502 and calibration member 520, to a set position. The set position corresponds to a predetermined angle between the pump head 12 and motor 10 to provide a desired dispensed volume per stroke.

The actual volume of fluid dispensed is then measured to determine if it corresponds to desired volume. If the dispensed volume is not correct, calibration can be undertaken. To do this, the calibration element 520 can be adjusted to protrude either more or less from the flag head 518. For example, if the output is too low, the calibration element can be extended from the flag head. This will result in a home position producing a larger initial angle, i.e., the angle when the drive rod 62 is in the home position. When the signal is given to the linear actuator 60 to adjust the angle, the set angle will now be larger, resulting in a larger dispense volume and flow rate. The calibration element can be further adjusted to until the desired dispense volume and flow rate is achieved.

The calibration system 500 provides for an easy way to calibrate the pump assembly without the need to change or reprogram software or make other adjustments. As the pump system 5 is utilized, it can be periodically checked and recalibrated as desired.

Figure 9:
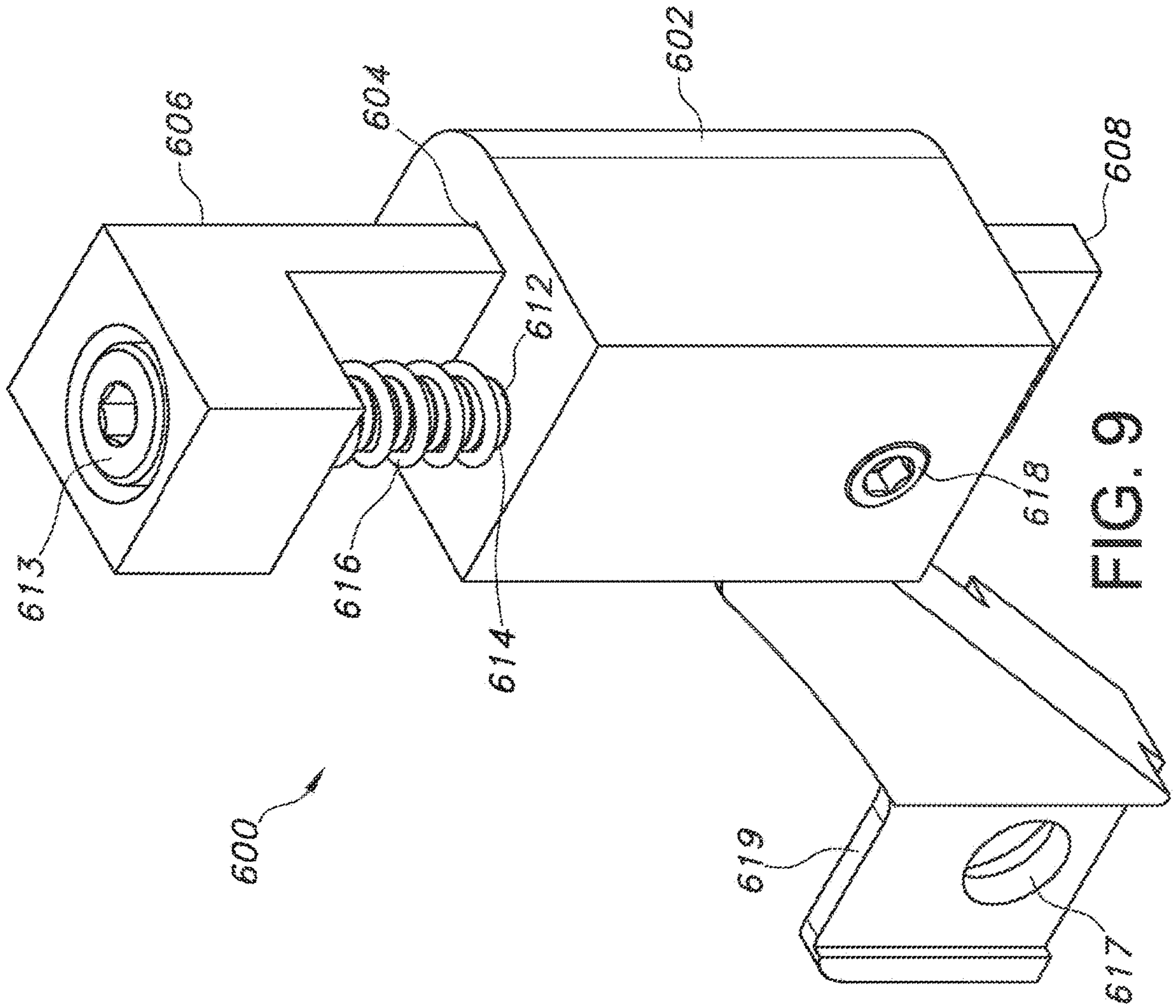
FIG. 9 is a perspective view of an alternative embodiment of the flag.

With reference to FIG. 9, an alternative embodiment to the calibration system flag is shown. Flag 600 may include a body 602 having a slot 604 formed there through. An elongate calibration element 606 extends through the slot and terminates in an end 608. The flag head cooperates with the sensor 502 in a manner similar to flag 504 described above. The calibration element 606 is positionally adjustable along the axis of the slot. The opposite end of the calibration element includes a projecting tab 610 having a threaded adjustment member 612 extending therethrough. The adjustment member 612 is parallel to the length of the slot 604. The adjustment member 612 includes a head 613 that is rotationally secured in the tab 610. The fastener threads into a threaded opening 614 in the body such that threading the threaded adjustment member in and out of the body moves the calibration element and thus the position of the end 608. A spring 616 is positioned over the fastener 612 and is captured between the body 602 and the tab 610. The spring biases the calibration element 606 away from the body to aide in adjustment. A securement device 618 such as a set screw, extends through the body and can be brought into engagement with the calibration element 606 to lock the calibration element in place relative to the body 602 once a desired calibration element end position is achieved. An arm 618 extends from the body and includes an opening 617 to accept a fastener (not shown) for securing the flag 600 to the drive rod coupler 72. A user can calibrate the system by turning the adjustment member 612 and adjusting the position of the calibration element relative to the sensor 502.

Figure 10:
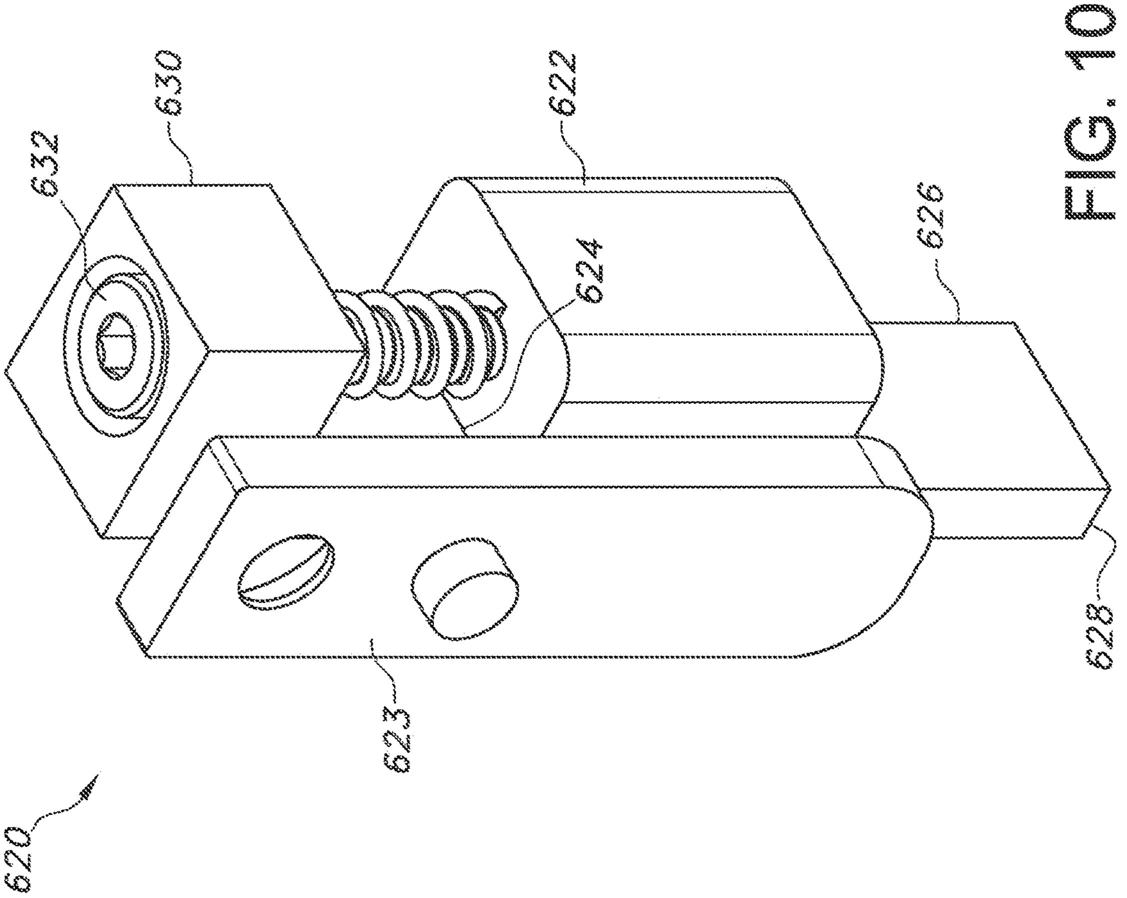
FIG. 10 is a perspective view of an alternative embodiment of an adjustable flag.

With reference to FIG. 10, in an alternative embodiment, flag 620 is similar to flag 600 described above, except that the flag 620 is connected directly to the lower base portion flange 54. The body 622 may have a mounting face 623 to engage and be secured to the side of the flange 54. The body 622 has a slot 624 extending there through and an elongate calibration element 626 extends through the slot and terminates in an end 628. The flag end 628 cooperates with the sensor 502 in a manner similar to flag 504 and 600 described above. The calibration element 626 is positionally adjustable along the axis of the slot. The opposite end of the calibration element includes a projecting tab 630 having a threaded adjustment member 632 extending therethrough. Rotation of the adjustment member 632 moves the calibration element 626 relative to the body 622 and to the flange 54 to which it is attached. A user can thus calibrate the system by turning the adjustment member 632 and adjusting the position of the calibration element relative to the sensor 502.

Figure 11:
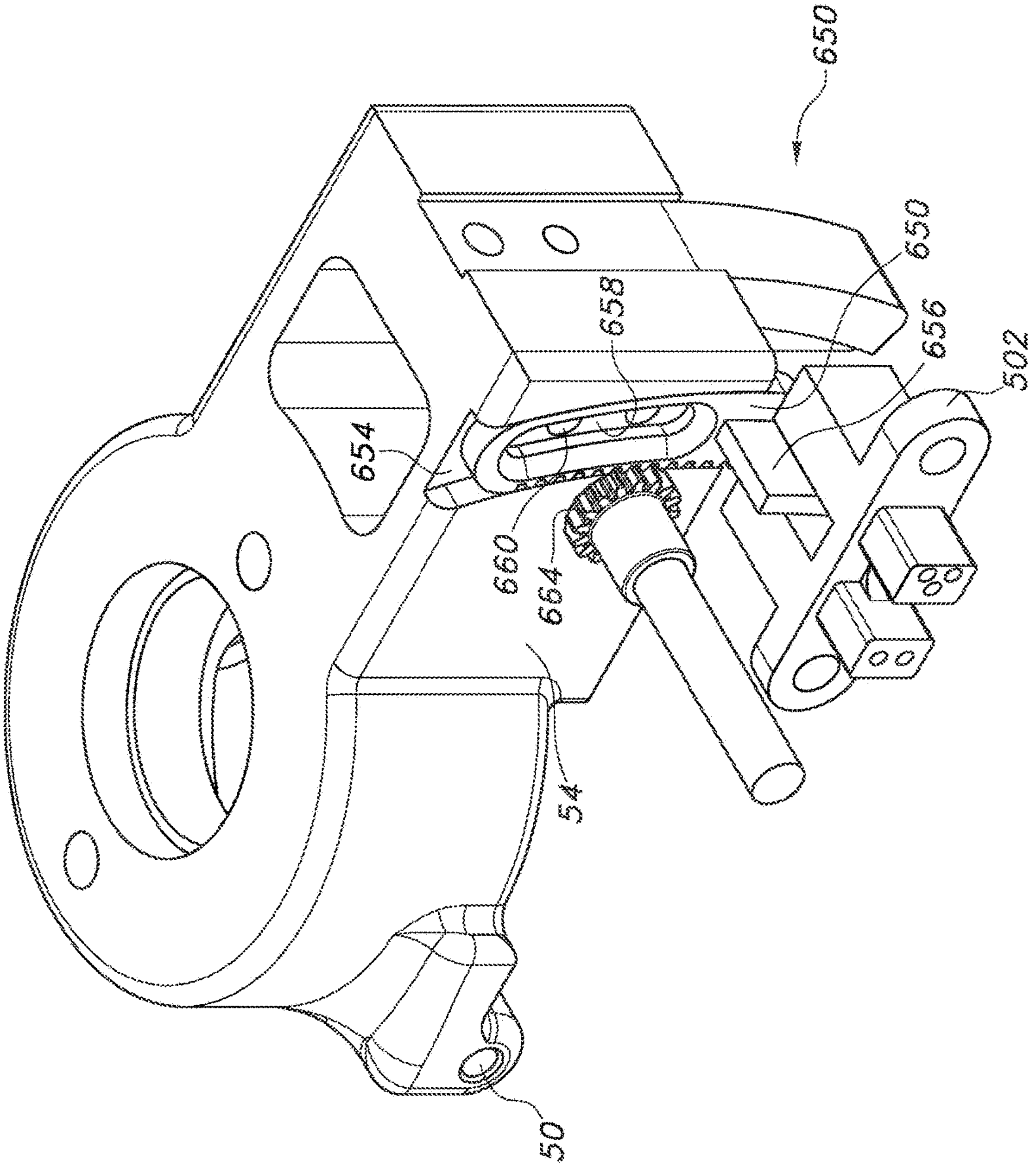
FIG. 11 is a perspective view of a further alternative embodiment of a flag system.
Figure 12:
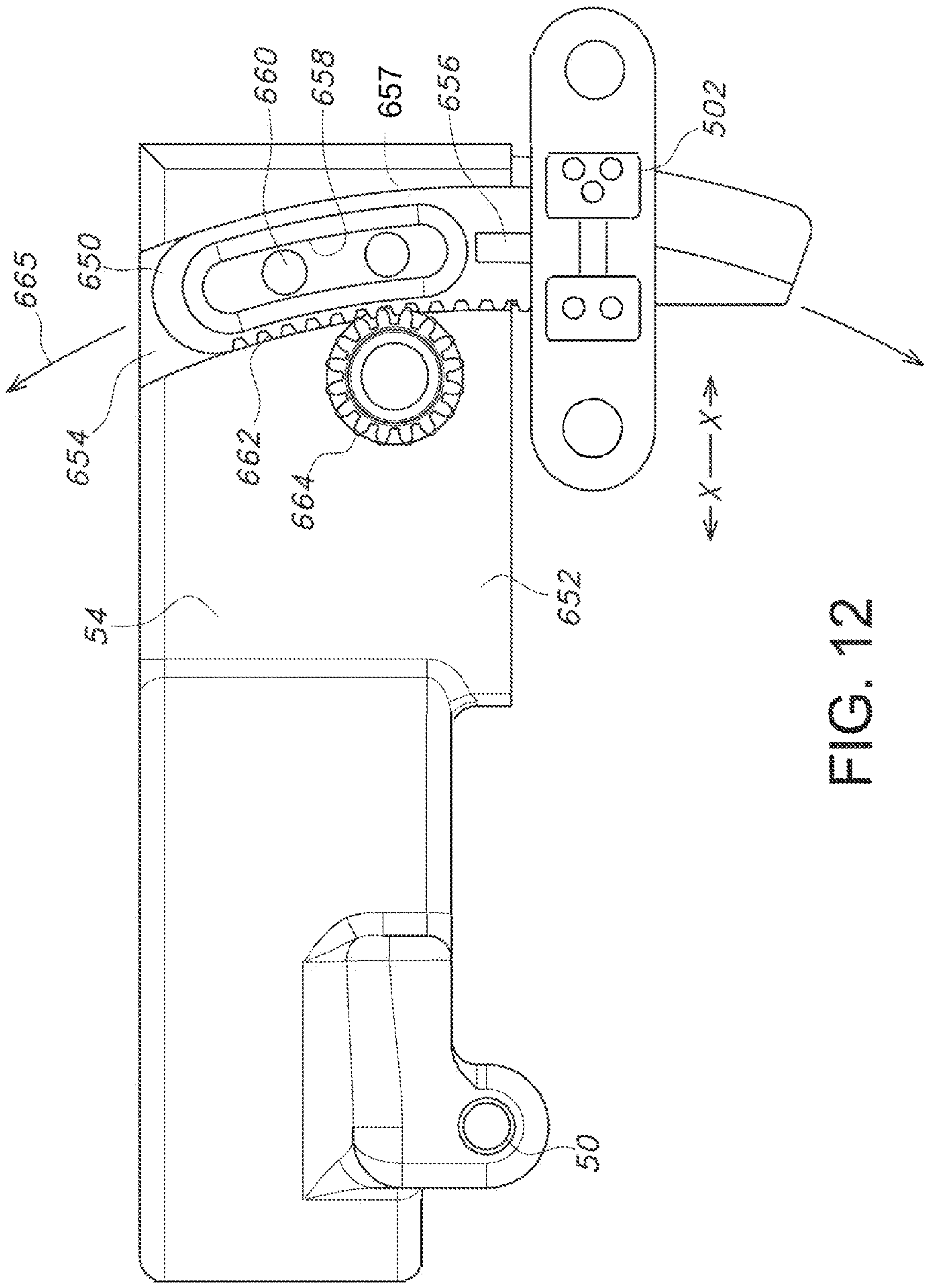
FIG. 12 is side elevational view of the flag system of FIG. 11.

With reference to FIGS. 11-12, an alternative calibration system flag is shown. In this embodiment, the calibration element 650 is secured to the lower base portion flange 54. Once the position of the flange 54 is set by the drive rod, the calibration element 650 can be positionally adjusted relative to the sensor 502 to calibrate the system. The flange 54 includes a sidewall 652 having a curved slot 654 therein. The calibration element 650 has a curved body 657 having a curvature similar to that of the curved slot 654 such that the calibration element 650 can move within the slot 654. The body 657 includes an opening 658 running along a portion of the length of the calibration element. One or more pins 660 pass through the opening 658 and into the flange 54 to movably secure the calibration element in the slot. An end portion 656 of the calibration element extends beyond the flange 54 and cooperates with the sensor 502 to calibrate the system.

One side of the calibration element may include a series of teeth 662 that cooperate with a toothed gear 664 rotatably secured on the flange 54. Rotation of the gear 664 causes the calibration element 650 to move in a curved path 665 that follows curvature of the curved slot 654. The curved slot has a radius corresponding to the distance between the curved slot and the hinge 50. In this manner the adjustment of the calibration element 650 will maintain its lateral position X-X relative to the sensor when its position is adjusted relative to the flange 54 for calibration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

For example, the computer device may be a personal computer, a notebook computer, a personal digital assistant ("PDA") or other hand-held device, a workstation, a mini-computer, a mainframe, a supercomputer, a multi-processor system, a network computer, a controller, a processor-based consumer electronic device, or the like.

While various embodiments of the present invention are specifically illustrated and/or described herein, it will be appreciated that modifications and variations of the present invention may be effected by those skilled in the art without departing from the spirit and intended scope of the invention.

I claim:

1. A calibration system for use with a displacement pump comprising a first base portion, a second base portion, and an actuator, the first base portion configured to rotate relative to the second base portion about a hinge using the actuator, the calibration system comprising:

a sensor configured to connect to the first base portion of the displacement pump; and a flag configured to connect to the second base portion of the displacement pump, the flag comprising an adjustable calibration element configured to move into a sensing path of the sensor to provide a signal when the linear actuator is in a predetermined position.

2. The calibration system of claim 1, wherein the calibration element is linearly adjustable.

3. The calibration system of claim 1, wherein the flag further comprises a body, the body configured to couple the flag to the second base portion and including an elongate arm.

4. The calibration system of claim 3, wherein the calibration element is adjustable relative to the body.

5. The calibration system of claim 4, wherein the calibration element is configured to remain fixed relative to the body unless adjusted by a user.

6. The calibration system of claim 4, wherein the flag further comprises a head connected to the body, the calibration element adjustably attached to the head.

7. The calibration system of claim 6, wherein the arm has an elongated shape that is connected between the body and the head.

8. The calibration system of claim 3, further comprising a controller coupled to the sensor, the sensor configured to send the signal to the controller when the calibration element of the flag moves into the sensing path of the sensor.

9. The calibration system of claim 8, wherein a location of the calibration element corresponds to a home position of the actuator.

10. The calibration system of claim 9, wherein the controller is configured to send a second signal to the actuator to move the actuator from the home position to a set position, the set position corresponding to a predetermined angle between the first base portion and the second base portion.

11. The calibration system of claim 1, wherein the flag comprises a body defining a slot and the calibration element is positioned in the slot.

12. The calibration system of claim 11, wherein the calibration element is adjustable in the slot.

13. The calibration system of claim 12, wherein the flag further comprises an adjustment member having an elongated section oriented parallel to a length of the slot, the adjustment member coupled between the calibration element and the body to adjust the calibration element relative to the body.

14. The calibration system of claim 1, wherein the flag further comprises a toothed gear, the calibration element comprising a series of teeth configured to cooperate with the toothed gear.

15. The calibration system of claim 14, wherein the calibration element comprises a curved body and the series of teeth are positioned on one side of the calibration element.

16. The calibration system of claim 15, wherein calibration element is adjustable relative to the sensor by rotating the toothed gear.

17. A displacement pump comprising the calibration system of claim 1.

18. A displacement pump comprising a motor connected to the first base portion and a pump connected to the second base portion, and the calibration system of claim 1.

19. The displacement pump of claim 18, wherein the flag is positioned on a side of the second base portion opposite to the hinge.

20. A flag for use in a calibration system for a displacement pump comprising:

a body configured to connect to a linear actuator of the displacement pump; and a head connected to the body, the head comprising an adjustable calibration element positioned therein;

wherein the adjustable calibration element is configured to move into a sensing path of a sensor positioned on a hinged base of the displacement pump, the calibration element indicating, via the sensor, when the linear actuator is in a predetermined position.

* * * * *